(12) United States Patent
Wang et al.

(10) Patent No.: US 8,805,847 B2
(45) Date of Patent: Aug. 12, 2014

(54) JOURNAL EVENT CONSOLIDATION

(75) Inventors: Xiaopin (Hector) Wang, Beijing (CN); Haiyang Zhang, Beijing (CN); Shaorong Li, Beijing (CN)

(73) Assignee: CA, Inc., Islandia, NY (US)

( * ) Notice: Subject to any disclaimer, the term of this patent is extended or adjusted under 35 U.S.C. 154(b) by 525 days.

(21) Appl. No.: 12/775,066

(22) Filed: May 6, 2010

(65) Prior Publication Data

US 2011/0276573 A1 Nov. 10, 2011

(51) Int. Cl.
*G06F 7/00* (2006.01)
*G06F 17/30* (2006.01)

(52) U.S. Cl.
USPC ........................................................ 707/740

(58) Field of Classification Search
None
See application file for complete search history.

(56) References Cited

U.S. PATENT DOCUMENTS

| | | | |
|---|---|---|---|
| 7,100,047 B2 | 8/2006 | Stamos et al. | |
| 7,177,994 B2 | 2/2007 | Galipeau et al. | |
| 7,310,716 B2 | 12/2007 | Galipeau et al. | |
| 7,409,547 B2 | 8/2008 | Stamos et al. | |
| 7,472,272 B2 | 12/2008 | Stamos et al. | |
| 7,613,750 B2 | 11/2009 | Valiyaparambil et al. | |
| 2004/0133577 A1 | 7/2004 | Miloushev et al. | |
| 2005/0060537 A1 | 3/2005 | Stamos et al. | |
| 2006/0047622 A1* | 3/2006 | Folkert et al. | 707/1 |
| 2006/0200498 A1 | 9/2006 | Galipeau et al. | |
| 2006/0224636 A1 | 10/2006 | Kathuria et al. | |
| 2006/0230082 A1 | 10/2006 | Jasrasaria | |
| 2007/0106858 A1 | 5/2007 | Galipeau et al. | |
| 2008/0077988 A1 | 3/2008 | Small | |
| 2008/0098043 A1 | 4/2008 | Galipeau et al. | |
| 2008/0140963 A1 | 6/2008 | Thomason et al. | |
| 2008/0228833 A1 | 9/2008 | Kano | |
| 2009/0150885 A1 | 6/2009 | Safari et al. | |
| 2009/0313503 A1* | 12/2009 | Atluri et al. | 714/19 |
| 2010/0023805 A1* | 1/2010 | Colaiacomo et al. | 714/15 |
| 2011/0282843 A1* | 11/2011 | Wang et al. | 707/649 |

FOREIGN PATENT DOCUMENTS

WO WO 2007118243 10/2007
WO WO 2007139647 12/2007

* cited by examiner

*Primary Examiner* — Rehana Perveen
*Assistant Examiner* — Raheem Hoffler
(74) *Attorney, Agent, or Firm* — Myers Bigel Sibley & Sajovec, P.A.

(57) ABSTRACT

Journal event consolidation extracts events occurring between two predetermined point in time on data volume, categorizes the events into categories of events, and consolidates the events in the categories of events.

20 Claims, 4 Drawing Sheets

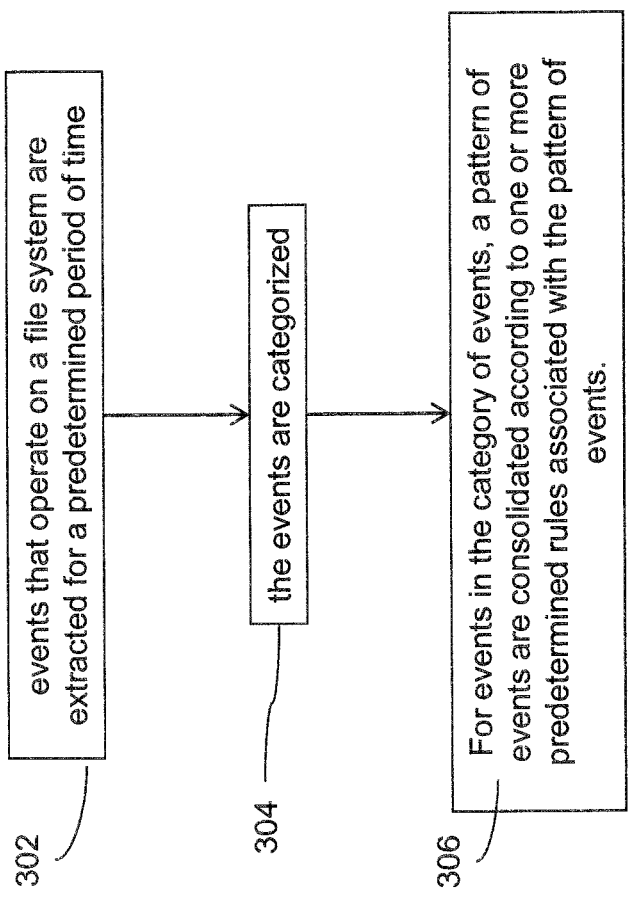

JOURNAL EVENT CONSOLIDATION

FIELD

The present disclosure relates generally to computer systems, backup and recovery systems, and more particularly to journal event consolidation.

BACKGROUND

Computer files and/or directories should be backed-up in a consistent state at least periodically. That is, the contents should not change while the backup is being made. A shadow volume copy is a copy of storage volume, for example, for backing-up data or files on the volume. The Volume Shadow Copy Service (VSS) is a Windows™ operating system utility that can be used to create a shadow copy. The VSS command, for example, may be issued to take a volume snapshot periodically, for example, every fifteen minutes to ensure that all application data and cache in the file system are flushed to disk.

The difference between the last snapshot and the current snapshot may be determined and sent to a backup system. The challenge, however, has been the performance of capturing the difference between two snapshots, for example, and optimizing the redundancy in the differences.

A minifilter file system driver may include the capability to capture every file and/or directory operation in a real time manner. However, such driver may lack the mechanism to know the exact time point of the consistent state during a snapshot in order to insert a bookmark automatically for the consistent state in the journal event sequence. The consistent state refers to the state of the data on the volume when the snapshot was taken. The exact time point of the snapshot may be used for recovery. For instance, data can be restored to any such point at which the data is application consistent, i.e., the restored data are equal to those of the snapshots at that time point. A consistent state means that a VSS snapshot contains all application consistent data which are flushed from memory and file system to disks prior to building the snapshot.

Also, a data synchronization process that synchronizes between production servers and replication servers may not ensure a consistent initial backup state since data are not read from the snapshot. For instance, recovery software may read the data such as the file and/or directory from the file system directly instead of the snapshot to avoid VSS performance hit because of copy on write. The VSS snapshot may be used only for building directory snapshot which records directory/file structures at the time point the snapshot is taken and released immediately. No file streams may be read from the VSS snapshot.

Another shortcoming may be related to the redundancy of the journal events generated during some period. For example, if the same region in a file is updated many times, only the content in the last update may need to be recorded and transferred. Currently, all the data updates are stored and transferred for backup, for example, transmitted over the network, which may be expensive in terms of data communication.

BRIEF SUMMARY

A method and system for consolidating journal events are provided. The method in one aspect may include categorizing a plurality of events operating on data during a predetermined period into one or more category of events, extracting a pattern of events from at least one of the category of events, and removing redundancy in the pattern of events by consolidating the pattern of events into a consolidated pattern of events based on one or more predetermined rules associated with the extracted pattern of events.

A system for consolidating journal events, in one aspect, may include a module operable to categorize a plurality of events operating on data volume into one or more category of events. The module may be further operable to extract a pattern of events from at least one of the category of events. The module may be yet further operable to remove redundancy in the pattern of events by consolidating the pattern of events into a consolidated pattern based on a predetermined rule associated with the pattern of events.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3 illustrates a method in one embodiment for consolidating journal events.

DETAILED DESCRIPTION

Figure 1A:
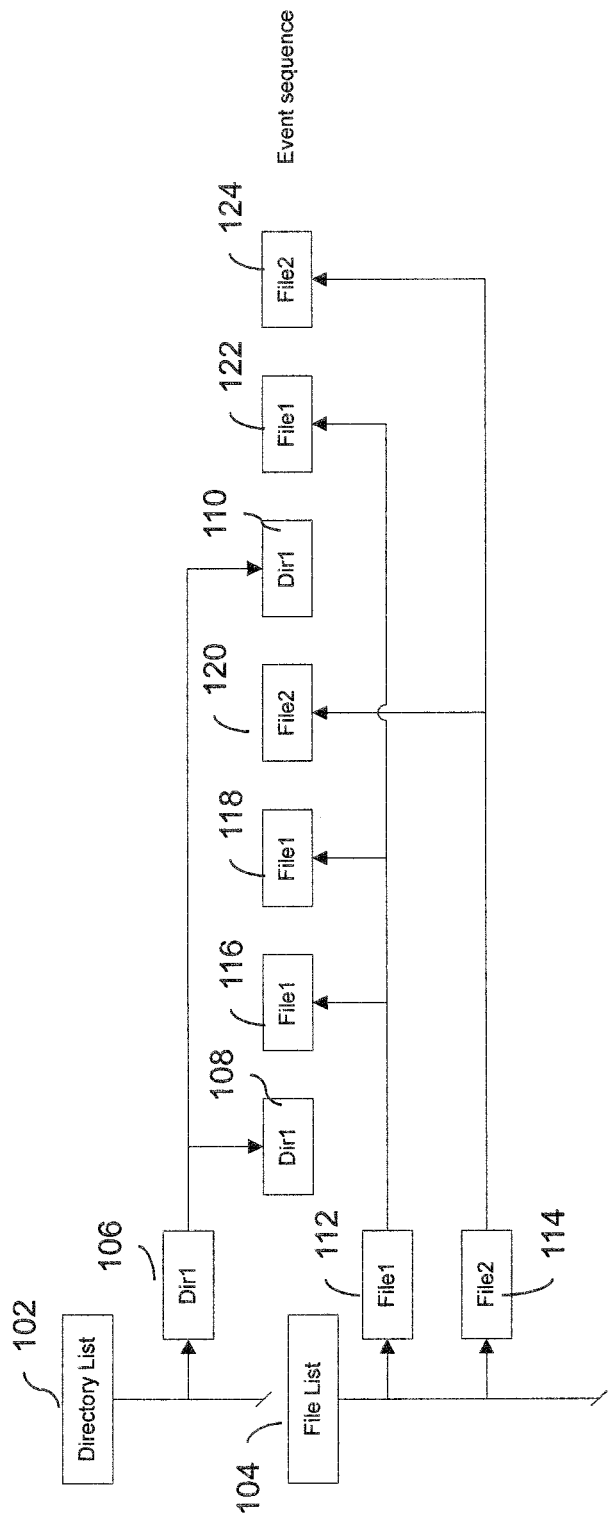
FIG. 1A illustrates a file and directory tree in one embodiment.

A computer module, software or the like, for example, backup or recovery software may implement shadow copies periodically, for instance, by issuing VSS calls. A filter module or software or the like may continue to monitor any file operation to generate. Journal events include one or more events that operate on data volume, for example, files and/or directories. Those events are recorded as journal events. Journal events between two snapshots may represent the differences between the two snapshots copies. In one aspect, a write event does not record the real updated data. Rather, the range of changed data is recorded, so that for example, the size of data recorded of the event is smaller. The event sequence may be scanned on the fly to determine which events may be removed or combined.

In one aspect, a filter driver or module (e.g., a file system mini filter driver) registers with the file system. During replication period, i.e., period during which a file is replicated or operated upon, the file system in operating system ("OS") notifies the registered filter driver of every file and/or directory operation. The filter driver of the present disclosure in one aspect, may record each operation to a journal event. Examples of such journal events are listed in Table 1. The recorded sequence of journal events (also referred to as journal event sequence) may be redundant after a period of time. For example, consider a case in which a file is renamed many times with some contents updated, but subsequently is deleted. In this example case, all the events about the file operation become useless, and therefore can be discarded (for example, with only the delete event remaining). The journal event consolidation of the present disclosure in one aspect consolidates the event sequence accumulated during a period of time. The events occurring during the period of time are consolidated into a consolidated sequence of events such that the effect of applying the consolidated sequence of events is the same as the effects of the events occurring during the period of time.

TABLE 1

Examples of journal event

| Type | Description |
| --- | --- |
| WRITE | Write data to a file |
| TRUNCATE | Truncate data from a file |
| CREATE | Create a file or directory |
| OPEN | Open a file or directory |
| CLOSE | Close a file or directory |
| CLOSE_REMOVE | Delete on close for a file or directory |
| REMOVE | Delete a file or directory |
| RENAME | Rename a file or directory |
| CHANGE_ATTR | Change the attributes for a file or directory |
| CHANGE_SECURITY | Change the security (e.g., ACL) for a file or directory |

As an example, the events in Table 1 may be divided into three categories of events.
Category 1: WRITE, TRUNCATE, CHANGE_ATTR AND CHANGE_SECURITY
Category 2: CREATE, OPEN, CLOSE, CLOSE-REMOVE, REMOVE AND RENAME for file
Category 3: CREATE, OPEN, CLOSE, CLOSE_REMOVE, REMOVE and RENAME for directory The first category has the attribute that the order of its events can be adjusted. For instance, in the following example, the first WRITE event can be moved to the end of the second event.

WRITE file1 (5, 10); any event; WRITE file1 (4, 12)

Thus, the following two event sequences are equivalent:
WRITE file1 (5, 10); any event; WRITE file1 (4, 12)
any event; WRITE file1 (5, 10); WRITE file 1(4, 12)

WRITE and TRUNCATE events focus on the content of a specific file. Only the last updates on a continuous data block are recorded in one aspect. In the above example, the event sequence may be optimized as follows by combining the two WRITE events:

any event; WRITE file1 (4, 12)

In the above example, the first WRITE event wrote from bytes or locations 5 to 10. The second WRITE event wrote from bytes or locations 4 to 12, which included the locations written to by the first WRITE event. Thus, the second WRITE event overwrote the areas written by the first WRITE event. Therefore, the second WRITE is the last update on those locations.

Similarly, only the last event of CHANGE_ATTR and CHANGE_SECURITY for a file or directory may be kept.

The second category of event may be partially combined. There may be four patterns in the event sequence that can be described by Regular Expression, i.e., all event sequences that belong to this category can fall into one of the 4 patterns:
Pattern 1: CREATE, [WRITE, TRUNCATE, RENAME]*, REMOVE
Pattern 2: [WRITE, TRUNCATE, RENAME]*, REMOVE
Pattern 3: CREATE, [WRITE, TRUNCATE, RENAME]*, CLOSE
Pattern 4: [WRITE, TRUNCATE, RENAME]*

Each pattern may have different strategy for event consolidation. In the above-provided patterns, [ ]* is a one of the regular expression.

Note that CLOSE_REMOVE is considered here for simplicity since it is equivalent to delayed REMOVE when encountering CLOSE later on. CLOSE_REMOVE refers to a regular expression. That is, any number (including 0) of event combinations in the brackets is allowed. For example, [WRITE, TRUNCATE, RENAME]* matches TRUNCATE, RENAME; WRITE, WRITE, TRUNCATE, WRITE, RENAME, WRITE; TRUNCATE, WRITE, WRITE.

For Pattern 1, all events in the pattern can be removed from the event sequence. For Pattern 2, the first event in the pattern can be replaced by REMOVE while others are removed from the event sequence. Pattern 3 may be optimized to: CREATE (with the final renamed file name), [WRITE, TRUNCATE]* (consolidated), CLOSE. For example, if the original sequence is: WRITE (4, 6), WRITE (5, 8), WRITE (11, 15), TRUNCATE (18), TRUNCATE (16). The aggregated or the consolidated sequence may be WRITE (4, 8), WRITE (11, 15), TRUNCATE (16). For Pattern 4, WRITE and TRUNCATE events may be combined and the combined events moved next to the last RENAME in the pattern.

The third category of events which are related to directory operations, in one aspect, are left alone. For example, in the following example, Rename root/dir1->root/dir2; some event; Rename root/dir2->root/dir3 the first and third events cannot be combined to root/dir1->root/dir3 unless it is known exactly that the second event has no side effect on the combination. This category of events may be kept aside during processing the event sequence.

An example algorithm design is described with reference to FIG. 1A. FIG. 1A illustrates a tree structure of directory and file lists. Initially, there are one empty File List 104, Directory List 102 and a Tree. The tree represents the current directory structure generated from the journal event sequence. The event sequence is sequentially scanned. A file system filter driver such as a minifilter driver may provide the event sequence. In response to coming across an event, the Tree is updated to reflect the current directory structures of the event sequence. By this way, any file or directory can be tracked where events operated on the same file are stored in one item in File List and events operated on the same directory are stored in one item in Directory List.

Figure 1B:
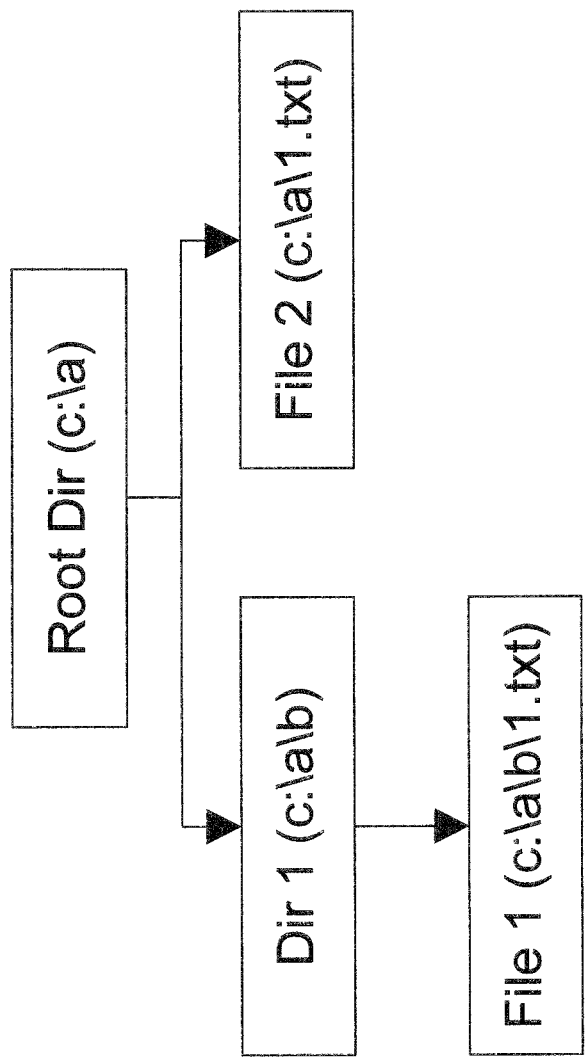
FIG. 1B illustrates a tree structure that may be formed as journal events are scanned.

FIG. 1A shows an example tree for the example event sequence: CREATE (c:\a\b), CREATE (c:\a\b\1.txt), CHANGE SECURITY (c:\a\b\1.txt), WRITE (c:\a\1.txt), CHANGE ATTR (c:\a\b), WRITE (c:\a\b\1.txt), WRITE (c: \a\1.txt). As each event is scanned, the tree illustrated in FIG. 1B may be formed. The element at 106 may be created to point to all Dir 1 related events as 108 and 110. The element at 112 may be created to point to all File 1 related events as 116, 118 and 122. The element at 114 may be created to refer to all File 2 related events as 120 and 124. Each element may contain specific file/directory properties. For example, WRITE event may contain changed data range and write time stamp.

Rename event changes names but they may be referred to by the same element. For example, if event following the above example event sequence is RENAME (c:\a\b\ 1.txt to c:\a\b\2.txt), the file "c:\a\b\2.txt" may be still referred to by the same element 112. As an example, the four patterns mentioned above may be analyzed by looking at each item in File List 104 to remove or modify some events in the event sequence.

Pattern 1: CREATE, [WRITE, TRUNCATE, RENAME]*, REMOVE
Operation: Remove the events from the event sequence.
Pattern 2: [WRITE, TRUNCATE, RENAME]*, REMOVE
Operation: Replace the first event by REMOVE and discard others in the event sequence.

Pattern 3: CREATE, [WRITE, TRUNCATE, RENAME, OPEN, CLOSE]*
Operation: Combine WRITE and TRUNCATE events and move the results to the last event. Replace the last RENAME event by CREATE and remove other RENAME events.
Pattern 4: [WRITE, TRUNCATE, RENAME, OPEN, CLOSE]*
Operation: Combine WRITE and TRUNCATE events and move the results to the last event.

Pattern matching may be utilized identify different event sequences, for example, for determining which consolidation operations to perform.

The combination of WRITE and TRUNCATE may be achieved by first removing all TRUNCATE except the last one, and second, making a union of WRITE events. For example, for the original sequence: WRITE (4, 6), WRITE (5, 8), WRITE (11, 15), TRUNCATE (18), TRUNCATE (16), the aggregated or consolidate sequence may be WRITE (4, 8), WRITE (11, 15), TRUNCATE (16).

For an item in File List 104 or Directory List 102, only the last CHANGE_ATTR and CHANGE_SECURITY may be kept.

Implementation Considerations:

The algorithm itself may be independent of memory usage and disk Input/Output (I/O). Cache and backtrack mechanism may be utilized to avoid high memory usage and disk IO. Meanwhile, the algorithm may be implemented to act on the fly when receiving an event.

Existing class, for instance, may express the Tree structure used by filter drivers.

Item in File List 104 may be expressed by the form of {initial full path name, current full path name, attr, security, a list of WRITE and TRUNCATE events, an array of pointers to the event sharing the same file in the event sequence}.

An example is illustrated.
Consider the following event sequence:
1. CREATE root_dir/dir1
2. CREATE root_dir/dir1/file1
3. WRITE root_dir/dir1/file1 (5, 10)
4. RENAME root_dir/dir2 to root_dir/dir3
5. RENAME root_dir/dir1/file1 to root_dir/dir3/file1
6. WRTTE root_dir/dir3/file1 (6, 11)
7. WRITE root_dir/dir3/file1 (7, 9)
Consolidation Sequence:
1. CREATE root_dir/dir1
2. RENAME root_dir/dir2 to root_dir/dir3
3. CREATE root_dir/dir3/file1
4. WRTTE root_dir/dir3/file1 (5, 11)

Truncate has two directions: shrinkage and expansion. For example, a file has 5K as its length. It can truncate to 3K as a shrinkage, or 8K as an expansion. When a file is truncated from a smaller size to a bigger size (expansion), the file system usually zeros the content between the two truncates. For instance, a file is first truncated to 3K and then to 8K. The content between 3K and 8K are zeroed.

Truncate events, e.g., truncation as an expansion, may have the effects of zeroing the area between the expansion. However, if SetFileValidData is invoked, the zeroing effects may be undermined, in which case, only the last truncate event needs to be kept.

If the zeroing effects occur, several truncate events can be consolidated to one or two truncate events depending on the last truncate event. All truncate events before the last one with the truncate location not smaller than that of the last one can be removed from the event sequence. The truncate event with smallest truncate location should be kept. For example, the truncate event sequence is:

Truncate(15), truncate(18), truncate(13), truncate(17), truncate(16)
The aggregation result is:
Truncate(13), truncate(16).
In another example:
Truncate(15), truncate(18), truncate(13), truncate(17), truncate(11)
The result may be simply one event: truncate(11).

Figure 2:
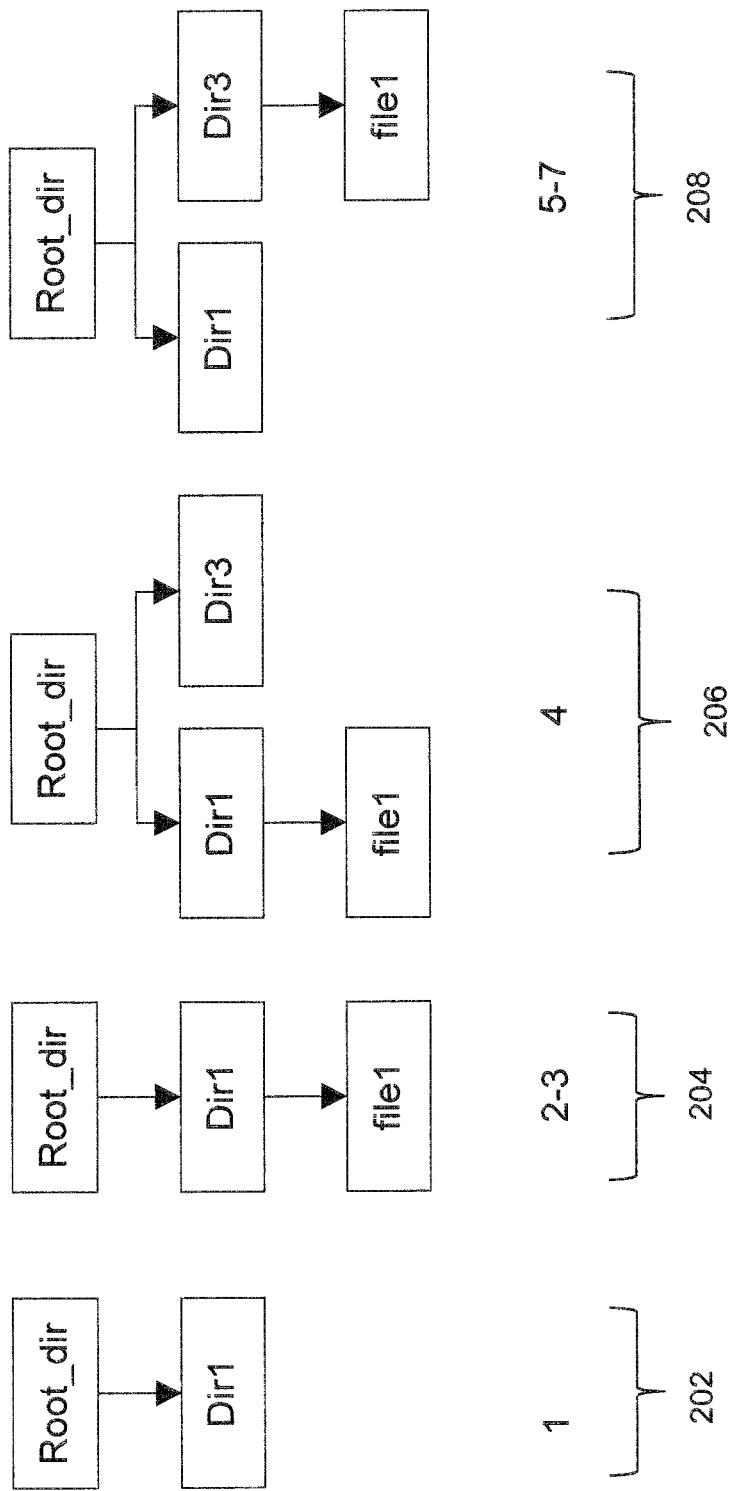
FIG. 2 illustrates capturing journal events in one embodiment of the present disclosure.

FIG. 2 illustrates a tree structure formed as event sequences are scanned or captured. The tree elements at 202 may be formed if an event exists that creates Dir1. The tree elements at 204 may be formed if an event exists that creates file1 in Dir1. The tree elements at 206 may be formed if an event exists that creates Dir 3. The tree elements at 208 may be formed if an event exists that moves file1 from Dir1 to Dir3.

FIG. 3 illustrates a method in one embodiment for consolidating journal events. At 302, events that operate on a file system are extracted for a predetermined period of time. At 304, the events are categorized. For events in the category of events, a pattern of events are consolidated according to one or more predetermined rules associated with the pattern of events. In one aspect, the predetermined period of time may be the time between two volume shadow copy snapshots.

The journal events in-between the snapshots represent the difference of the snapshots. Instead of sending the big VSS snapshot periodically, the data protected from first VSS snapshot are sent to replication servers. Subsequently, only the differences on each round of VSS snapshot are sent. This process assumes that the first VSS snapshot plus the differences can derive the same VSS snapshot in the next round.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for consolidating journal events, comprising:
categorizing a plurality of events operating on data during a predetermined period into one or more category of events;
extracting a pattern of events from the one or more category of events, wherein the pattern of events comprises two or more truncate events, each truncate event indicating a file system filter driver operating on the data has truncated a file to shrink or expand the file; and
removing redundancy in the pattern of events by consolidating the pattern of events into a consolidated pattern of events based on one or more predetermined rules associated with the extracted pattern of events, wherein consolidating the pattern of events comprises removing from the pattern of events all truncate events except for last truncate event and creating a union of all write events in the pattern of events to indicate a full range of data effected by all the write events in the pattern of events.

2. The method of claim 1, wherein one of the one or more category of events includes write event, truncate event, change attribute event and change security event.

3. The method of claim 1, wherein one of the one or more category of events includes events that operate on files.

4. The method of claim 1, wherein the step of consolidating includes combining at least two write events into one write event, and replacing last write event in the pattern of events with the one write event.

5. The method of claim 1, wherein the step of consolidating includes removing all events from the pattern of events, in response to detecting a create event as first event in the pattern of events and a remove event as last event in the pattern of events.

6. The method of claim 1, wherein the step of consolidating includes removing all events except for a remove event, in response to detecting the remove event as last event in the pattern of events and the pattern of events includes one or more of write event, truncate event, or rename event or combinations thereof.

7. The method of claim 1, wherein the step of consolidating includes removing a rename event indicating a file or directory name was changed, in response to detecting a create event indicating the file or directory was created as first event in the pattern of events and a close event indicating the file or directory was closed as last event in the pattern of events.

8. The method of claim 1, wherein the step of consolidating includes combining a write event and a truncate event.

9. The method of claim 1, wherein removing from the pattern of events all truncate events except for last truncate event comprises not removing truncate events larger than the last truncate event.

10. The method of claim 1, wherein the step of consolidating includes keeping only last change attribute event occurring in the pattern of events.

11. The method of claim 1, wherein the step of consolidating includes keeping only last change security event occurring in the pattern of events.

12. The method of claim 1, wherein the predetermined period of time is time between two volume shadow copy snapshots.

13. A computer readable storage medium storing a program of instructions executable by a machine to perform a method of consolidating journal events, comprising:
categorizing a plurality of events operating on data volume into one or more category of events;
extracting a pattern of events from the one or more category of events, wherein the pattern of events comprises two or more truncate events, each truncate event indicating a file system filter driver operating on the data has truncated a file to shrink or expand the file; and
removing redundancy in the pattern of events by consolidating the pattern of events into a consolidated pattern based on a predetermined rule associated with the pattern of events, wherein consolidating the pattern of events comprises removing from the pattern of events all truncate events except for last truncate event and creating a union of all write events in the pattern of events to indicate a full range of data effected by all the write events in the pattern of events.

14. The computer readable storage medium of claim 13, wherein one of the one or more category of events includes write event, truncate event, change attribute event and change security event.

15. The computer readable storage medium of claim 13, wherein one of the one or more category of events includes events that operate on files.

16. The computer readable storage medium of claim 13, wherein the predetermined period of time is time between two volume shadow copy snapshots.

17. A method for consolidating journal events, comprising:
categorizing a plurality of events operating on data volume into one or more category of events;
extracting a pattern of events from the one or more category of events; and
removing redundancy in the pattern of events by consolidating the pattern of events into a consolidated pattern by removing a rename event indicating a file or directory name was changed, in response to detecting a create event indicating the file or directory was created as first event in the pattern of events and a close event indicating the file or directory was closed as last event in the pattern of events.

18. The method of claim 17, wherein one of the one or more category of events includes write event, truncate event, change attribute event and change security event.

19. The method of claim 17, wherein one of the one or more category of events includes events that operate on files.

20. The method of claim 17, wherein the predetermined period of time is time between two volume shadow copy snapshots.

* * * * *

UNITED STATES PATENT AND TRADEMARK OFFICE
CERTIFICATE OF CORRECTION

PATENT NO. : 8,805,847 B2  
APPLICATION NO. : 12/775066  
DATED : August 12, 2014  
INVENTOR(S) : X. H. Wang et al.

Page 1 of 1

It is certified that error appears in the above-identified patent and that said Letters Patent is hereby corrected as shown below:

Title Page (57) Abstract, line 2, please change "two predetermined point" to -- two predetermined points --

Signed and Sealed this
Twenty-sixth Day of May, 2015

Michelle K. Lee
*Director of the United States Patent and Trademark Office*